United States Patent [19]

Takahashi

[11] Patent Number: 4,730,909
[45] Date of Patent: Mar. 15, 1988

[54] VIEW DIRECTION CHANGING OPTICAL SYSTEM FOR ENDOSCOPES

[75] Inventor: Susumu Takahashi, Hachiouji, Japan

[73] Assignee: Olympus Optical Co., Ltd., Tokyo, Japan

[21] Appl. No.: 652,562

[22] Filed: Sep. 20, 1984

[30] Foreign Application Priority Data

Sep. 20, 1983 [JP] Japan ................. 58-173627

[51] Int. Cl.$^4$ ............ G02B 23/26; G02B 17/00; G02B 23/02
[52] U.S. Cl. .................. 350/445; 350/96.26; 350/447
[58] Field of Search ............ 350/96.26, 445, 447

[56] References Cited

U.S. PATENT DOCUMENTS 4,173,394 11/1979 Clave et al. .................. 350/445 X

FOREIGN PATENT DOCUMENTS 926624 3/1955 Fed. Rep. of Germany.
898664 7/1944 France .................. 350/445

Primary Examiner—John K. Corbin
Assistant Examiner—Scott J. Sugarman
Attorney, Agent, or Firm—Cushman, Darby & Cushman

[57] ABSTRACT

A view direction changing optical system provided with a first optical member having a first reflecting surface for bending downward the optical axis along the lengthwise direction of an endoscope and a second optical member arranged adjacently to the lower part of the front side of the first optical member and having two second reflecting surfaces for further bending toward a predetermined oblique view direction the optical axis bent by the first reflecting surface, to make it possible to provide a compact endoscope capable of rear viewing.

4 Claims, 5 Drawing Figures 4,730,909

VIEW DIRECTION CHANGING OPTICAL SYSTEM FOR ENDOSCOPES

BACKGROUND OF THE INVENTION (a) Field of the Invention

This invention relates to a view direction changing optical system adapted to endoscopes or particularly side view or rear view type hard endoscopes.

(b) Description of the Prior Art

In the case of any of straight view, oblique view, side view and rear view types, an endoscope is required to be designed so as to be housed in one pipe to make it air-tight (water-tight). Conventionally, in the straight view, oblique view and side view types, small optical systems are known. However, in the rear view type (in which the angle between the incident direction of light into an objective lens and the longitudinal direction of the endoscope is larger than 90 degrees), now there is no way to make the optical system small. The formation of the optical system which can be comparatively easily thought out by those skilled in the art to enable the rear view will be such formation as is shown in FIG. 1 or 2. However, in the case of such formation as is shown in FIGS. 1 and 2, in the case that the optical axis is to be bent once or twice, a lens L having a concave surface will have to be above the optical axis 0. Therefore, such concave lens can not be contained compactly in the pipe P in which the first optical member 1 and second optical member 2 can be compactly contained. Therefore, now there is no endoscope capable of rear viewing.

SUMMARY OF THE INVENTION

In view of the above mentioned circumstances, a primary object of the present invention is to provide a view direction changing optical system adapted to endoscopes or particularly hard endoscopes and formed so as to be able to be contained compactly in a pipe and capable of rear viewing.

According to the present invention, this object is attained by a formation wherein adjacently to the lower part of the front side of a first optical member having a first reflecting surface for bending downward an optical axis along the length lengthwise direction of an endoscope, there is arranged a second optical member having a plurality of second reflecting surfaces for further bending toward a predetermined oblique view direction the optical axis bent by the above mentioned first reflecting surface. The first optical member and second optical member may be jointed directly with each other or the second optical member may be arranged through a slight air gap from a glass plate jointed to the first optical member.

According to the present invention, a view direction changing optical system capable of rear viewing can be formed so compactly and simply that the use of such endoscope as a hard endoscope can be further expanded.

This and other objects of the present invention will become more apparent during the course of the following detailed description and appended claims.

DESCRIPTION OF THE PREFERRED EMBODIMENTS

Figure 1:
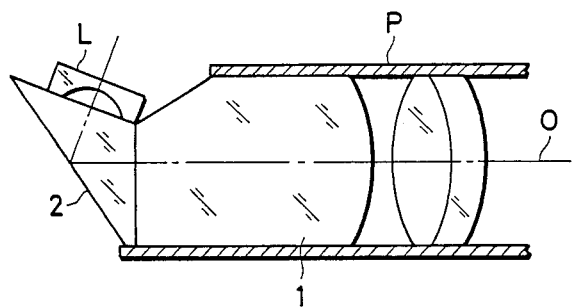
FIG. 1 is a formation view of a conventional example of a view direction changing optical system for endoscopes.
Figure 2:
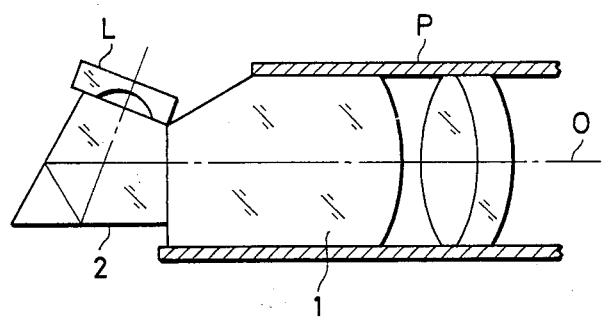
FIG. 2 is a formation view of another conventional example.
Figures 3, 4:
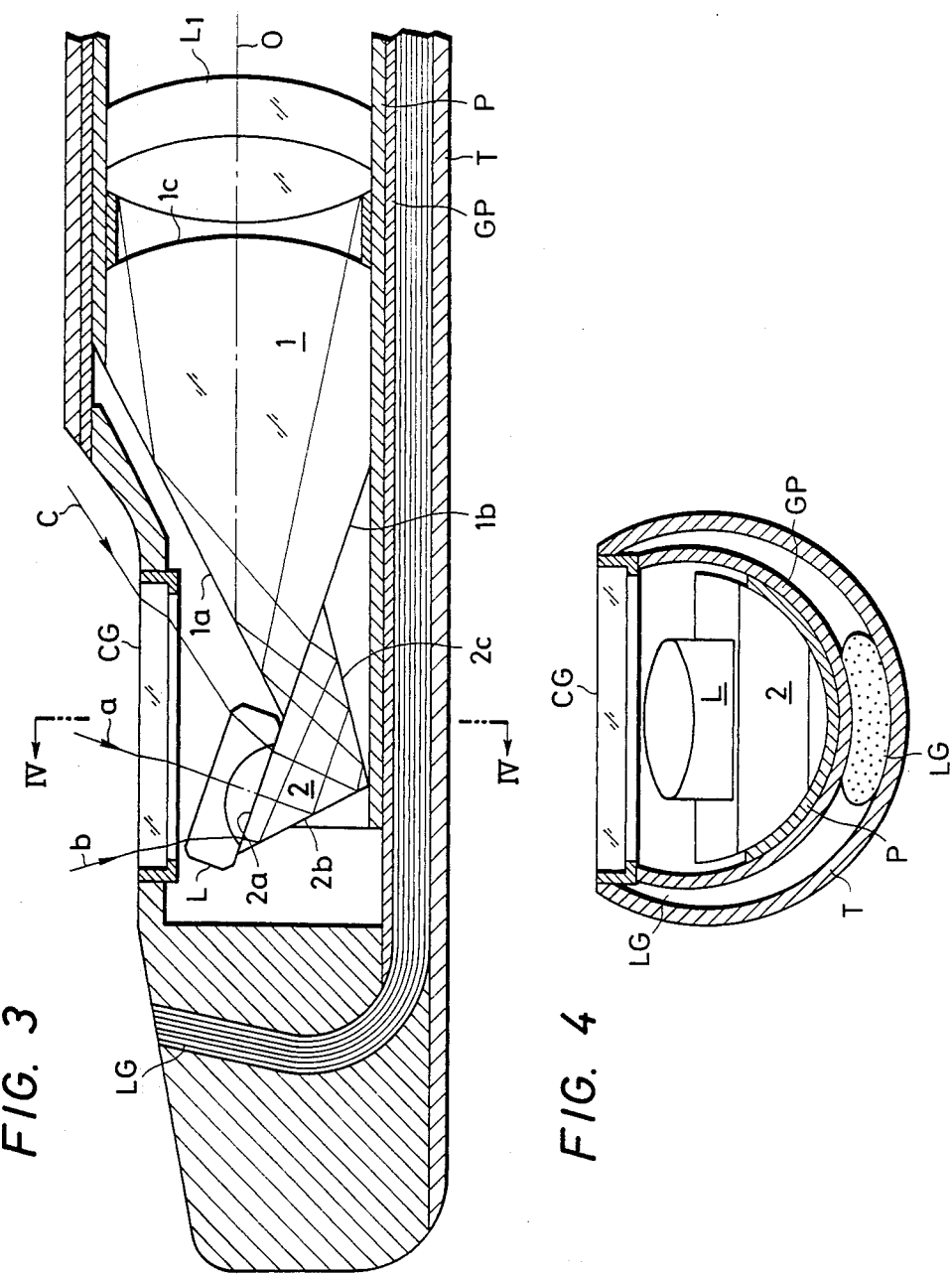
FIG. 3 is a vertically sectioned view of a hard endoscope tip part containing an embodiment of the view direction changing optical system according to the present invention.
FIG. 4 is a sectioned view on line IV—IV in FIG. 3.

The embodiments in which the present invention is applied to a hard endoscope shall be explained in detail in the following by attaching the same reference numerals respectively to the members substantially identical with those shown in FIGS. 1 and 2. Referring to FIGS. 3 and 4, the symbol T denotes a tube made of stainless steel, GP denotes a guide pipe inserted and fixed coaxially with the optical axis within the tube T, P denotes a pipe pressed into the guide pipe GP, the reference numeral 1 denotes a first optical member fixed within the pipe P and having a reflecting surface 1a intersecting obliquely from above with the optical axis 0, a cementing surface 1b positioned below the optical axis 0 and a spherical surface 1c coaxial with the optical axis 0, 2 denotes a second optical member arranged on the lower part of the front side of the first optical member 1 and having a light introducing surface 2a partly cemented to the cementing surface 1b of the first optical member 1 and a pair of reflecting surfaces 2b and 2c capable of reflecting the light introduced by said light introducing surface 2a so as to be led into the first optical member 1 through the cementing surface 1b, the symbol L denotes a concave surface lens, which is a top lens secured on the light introducing surface 2a of the second optical member 2, CG denotes a cover glass fitted liquid-tightly to the tube T as coordinated with the lens L having a concave surface and LG denotes a light guide for leading an illuminating light from a light source not illustrated to illuminate the visual field range of an object to be inspected, and $L_1$ denotes a cemented lens arranged behind the first optical member 1. In this case, the second optical member 2 is positioned below the optical axis 0 as illustrated and its shape and the position of the cementing surface 1b are so selected that the light introducing surface 2a may be directed to a predetermined rear view direction, and the lens L having a concave surface, first optical member 1, second optical member 2 and cemented lens $L_1$ form an objective.

As the first embodiment according to the present invention is formed as mentioned above, the lights a, b and c (a denotes the light along the optical axis, b denotes one peripheral light and c denotes the other peripheral light) introduced into the second optical member 2 through the cover glass CG, lens L having a concave surface and light introducing surface 2a from the object to be inspected will be reflected as illustrated by the reflecting surfaces 2b and 2c, will be introduced into the first optical member 1 through the cementing surface 1b, will be further reflected by the reflecting surface 1a and will be led to the lens $L_1$. Thus, a rear view will be able to be realized. As evident from this explanation, the view direction changing optical system comprising the first optical member 1, second optical member 2 and concave lens L can be compactly contained within the pipe P so as to be adaptable even to the contour, for example, of a needle-shaped hard endoscope tip part. The assembly can be completed by only assembling and fixing these optical members within the pipe P in advance and them pressing this pipe P into the guide pipe GP much to the advantage of the manufacture.

Figure 5:
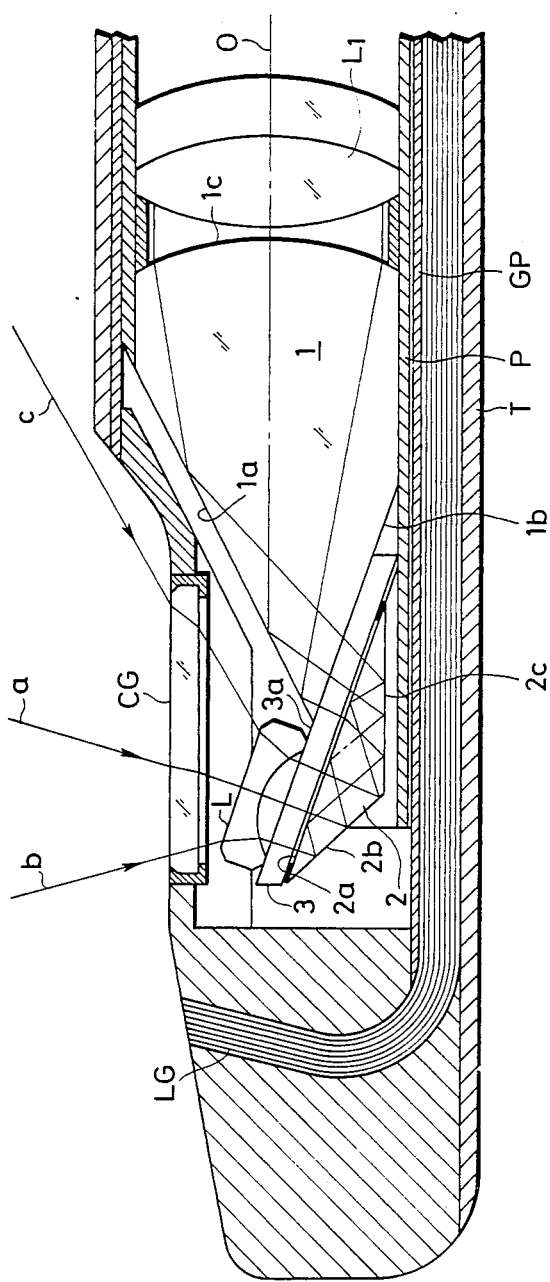
FIG. 5 is a vertically sectioned view of a hard endoscope tip part containing another embodiment of the visual field direction changing optical system according to the present invention.

FIG. 5 shows another embodiment of the present invention. This embodiment is different from the above described embodiment in respect that a parallel plane glass plate 3 having a light introducing surface 3a is cemented to the cementing surface 1b of the first optical member 1, the concave lens L having a concave surface is secured on this light introducing surface 3a, the second opitcal member 2 is secured through a slight air gap on the surface on the side opposite the light introducing surface 3a so that the light from the object to be inspected may be led into the first optical member 1 through the cover glass CG, lens L having a concave surface, parallel plane glass plate 3, second optical member 2 and again the parallel plane glass plate 3. In this case, as illustrated, the light introduced into the second optical member 2 will be reflected by one reflecting surface 2b, then will be totally reflected by the light introducing surface 2a, will be again reflected by the other reflecting surface 2c and then will be led into the first optical member 1. However, the other formations and operations are the same as of the above described embodiment. Therefore, the same reference numerals shall be attached respectively to the same members and the explanation shall be omitted.

In the above embodiment, the invention has been explained on the hard endoscope but it is needless to say that the present invention can be applied as it is to various endoscopes of other types. Each optical member described above can be formed of glass, plastics or the like. Further, in the above described embodiments, prisms are used as the optical members, but the prisms may be replaced with reflecting mirrors.

What is claimed is:

1. A view direction changing optical system for endoscopes comprising:
    a housing having a longitudinal axis, a front end and a rearward portion;
    a top entrance lens arranged on said housing so that its light entrance surface is oriented obliquely rearwardly of said housing;
    a first reflecting surface arranged under said top entrance lens and reflecting rearwardly incident light;
    a second reflecting surface reflecting the incident light so as to make the light travel along the longitudinal axis of the housing of the endoscope, said second reflecting surface being positioned rearwardly of said top entrance lens and being formed on one surface of a first optical member arranged behind said top lens; and
    a third reflecting surface provided for directing the light reflecting by said first reflecting surface to said second reflecting surface and arranged between said first reflecting surface and said second reflecting surface,
    said first reflecting surface and said third reflecting surface being formed on two surfaces of a second optical member arranged on the lower part of the front side of said first optical member,
    said light reflected by said first reflecting surface entering said third reflecting surface after said light has been reflected by a surface of said second optical member.

2. A view direction changing optical system for endoscopes comprising a housing having a longitudinal axis and a front end and a rearward portion, a top entrance lens arranged on said housing so that its light entrance surface is oriented obliquely rearwardly of said housing, a first reflecting surface arranged under said top entrance lens, and a second reflecting surface reflecting incident light so as to advance the light along the longitudinal axis of the housing of the endoscope, said second reflecting surface being positioned rearwardly of said top entrance lens and a third reflecting surface being provided for directing the light reflected by said first reflecting surface to said second reflecting surface and being arranged between said first reflecting surface and said second reflecting surface, said first optical member which includes said second reflecting surface formed on one surface thereof and said second optical member which includes said first and third reflecting surfaces formed thereon being cemented to each other, the cemented surface of said first and second optical members including an extended part, and said top entrance lens adhering to said extended part to lead the light into said second optical member from outside.

3. A view direction changing optical system for endoscopes comprising a housing having a longitudinal axis and a front end and a rearward portion, a top entrance lens arranged on said housing so that its light entrance surface is oriented obliquely rearwardly of said housing, a first reflecting surface arranged under said top entrance lens, and a second relecting surface reflecting incident light so as to advance the light along the longitudinal axis of the housing of the endoscope, said second reflecting surface being positioned rearwardly of said top entrance lens and a third reflecting surface being provided for directing the light reflected by said first reflecting surface to said second reflecting surface and being arranged between said first reflecting surface and said second reflecting surface, said endoscope further comprising a glass plate cemented to said first optical member which includes said second reflecting surface formed on one surface thereof and said second optical member which includes said first and third reflecting surfaces formed thereon being arranged to face said glass plate through a slight air gap between them, said endoscope further comprising a concave lens secured on the extended part of the cemented surface of said glass plate to said first optical member to lead the light into said second optical member through said glass plate from outside.

4. A view direction changing optical system for endoscopes comprising:
    a housing having a longitudinal axis, a front end and a rearward portion;
    a top entrance lens arranged on said housing so that its light entrance surface is oriented obliquely rearwardly of said housing;
    a first reflecting surface arranged under said top entrance lens and reflecting rearwardly incident light;
    a second reflecting surface reflecting the incident light so as to make the light travel along the longitudinal axis of the housing of the endoscope,
    said second reflecting surface being positioned rearwardly of said top entrance lens and being formed on one surface of a first optical member arranged behind said top lens;

a third reflecting surface provided for directing the light reflected by said first reflecting surface to said second reflecting surface and arranged between said first reflecting surface and said second reflecting surface, said first reflecting surface and said third reflecting surface being formed on two surfaces of a second optical member arranged on the lower part of the front side of said first optical member, said light reflected by said first reflecting surface entering said third reflecting surface after said light has been reflected by a surface of said second optical member; and a transparent plate extending over the front of said first optical member and cemented to the entrance surface of said first optical member, a said transparent plate being engaged by said top lens on one surface of said plate and being cemented to said second optical member at its peripheral portion on the opposite surface of said plate with a slight air gap.

* * * * *